US011441477B2

(12) United States Patent
Miller et al.

(10) Patent No.: US 11,441,477 B2
(45) Date of Patent: Sep. 13, 2022

(54) METHOD FOR PREVENTING OR REDUCING LOW SPEED PRE-IGNITION IN DIRECT INJECTED SPARK-IGNITED ENGINES WITH SILANE-CONTAINING LUBRICANT

(71) Applicants: Chevron Oronite Company LLC, San Ramon, CA (US); Chevron U.S.A. Inc., San Ramon, CA (US)

(72) Inventors: John Robert Miller, San Rafael, CA (US); Richard Eugene Cherpeck, Cotati, CA (US); Ian G. Elliott, Vacaville, CA (US); Theresa Liang Gunawan, Emeryville, CA (US); Amir Gamal Maria, Fremont, CA (US)

(73) Assignees: CHEVRON ORONITE COMPANY LLC, San Ramon, CA (US); CHEVRON U.S.A. INC., San Ramon, CA (US)

(*) Notice: Subject to any disclaimer, the term of this patent is extended or adjusted under 35 U.S.C. 154(b) by 0 days.

(21) Appl. No.: 16/407,371

(22) Filed: May 9, 2019

(65) Prior Publication Data

US 2019/0360383 A1 Nov. 28, 2019

Related U.S. Application Data

(60) Provisional application No. 62/676,504, filed on May 25, 2018.

(51) Int. Cl.

| | | |
|---|---|---|
| *C10M 113/12* | (2006.01) |
| *C10M 125/26* | (2006.01) |
| *F02B 19/12* | (2006.01) |
| *C10M 141/10* | (2006.01) |
| *C10M 171/00* | (2006.01) |
| *C10M 171/04* | (2006.01) |
| *F02B 75/02* | (2006.01) |
| *C07F 7/14* | (2006.01) |
| *C10N 30/00* | (2006.01) |
| *C10N 40/26* | (2006.01) |
| *C10N 30/08* | (2006.01) |

(52) U.S. Cl.
CPC .............. *F02B 19/12* (2013.01); *C07F 7/14* (2013.01); *C10M 113/12* (2013.01); *C10M 125/26* (2013.01); *C10M 141/10* (2013.01); *C10M 171/005* (2013.01); *C10M 171/04* (2013.01); *F02B 75/02* (2013.01); *C10N 2030/00* (2013.01); *C10N 2030/08* (2013.01); *C10N 2040/26* (2013.01)

(58) Field of Classification Search
CPC ...... C07F 7/14; C10M 113/12; C10M 125/26; C10M 169/04; C10N 2030/08; C10N 2030/50; C10N 2030/76
USPC .................. 123/196 R, 196 S; 508/207–215
See application file for complete search history.

(56) References Cited

U.S. PATENT DOCUMENTS

| | | | |
|---|---|---|---|
| 4,320,019 A | 3/1982 | Hayashi | |
| 4,541,838 A | 9/1985 | Zaweski et al. | |
| 4,572,791 A | 2/1986 | Onopchencko et al. | |
| 4,950,779 A | 8/1990 | Wengrovius et al. | |
| 5,120,485 A | 6/1992 | Johnson | |
| 5,489,701 A | 2/1996 | Childress et al. | |
| 5,596,116 A | 1/1997 | Childress et al. | |
| 6,127,468 A | 10/2000 | Cruse et al. | |
| 6,140,445 A | 10/2000 | Su et al. | |
| 6,359,046 B1 | 3/2002 | Cruse | |
| 6,372,696 B1 | 4/2002 | Tipton | |
| 6,887,835 B1* | 5/2005 | Migdal ............... C10M 139/04 508/204 |
| 7,217,683 B1* | 5/2007 | Blanski ............... C10M 171/06 508/208 |
| 7,838,614 B2* | 11/2010 | Thum .................... C08G 77/46 528/25 |
| 7,867,960 B2 | 1/2011 | Yamaguchi et al. | |
| 2007/0244016 A1* | 10/2007 | Buck .................... C10M 141/12 508/185 |
| 2008/0058232 A1 | 3/2008 | Yamaguchi et al. | |
| 2011/0245118 A1 | 10/2011 | Nelson et al. | |
| 2015/0275127 A1* | 10/2015 | Patil .................... C10M 139/04 508/208 |
| 2015/0284655 A1* | 10/2015 | Penman ................ C08L 83/06 427/515 |
| 2016/0046887 A1* | 2/2016 | Avataneo ............. C10M 109/02 508/577 |
| 2018/0237718 A1* | 8/2018 | Stidder ................ C10M 101/00 |
| 2018/0273871 A1* | 9/2018 | Hishinuma .......... C10M 141/10 |

FOREIGN PATENT DOCUMENTS

| | | |
|---|---|---|
| EP | 3366755 | 8/2018 |
| GB | 1441335 | 11/1973 |
| WO | 2017147380 | 8/2017 |
| WO | 2017147380 A1 | 8/2017 |

OTHER PUBLICATIONS

"The Turbocharged Direct Injection Spark-Ignition Engine", Turner and Pearson, pp. 45-90, from Advanced direct injection combustion engine technologies and development vol. 1: , Woodhead Publishing Limited, 2010.*
Amann et al.. SAE 2012-01-1140.
International Search Report, dated Aug. 14, 2019, during the prosecution of International Application No. PCT/IB2019/053829.
Written Opinion of the International Searching Authority, dated Aug. 14, 2019, during the prosecution of International Application No. PCT/IB2019/053829.

* cited by examiner

*Primary Examiner* — Erick R Solis

(57) ABSTRACT

Disclosed is a lubricating engine oil composition for use in down-sized boosted engines comprising a lubricating oil base stock as a major component, and at least one silane-containing compound. Also disclosed is a method for preventing or reducing low speed pre-ignition in a direct injected, boosted, spark ignited internal combustion engine, and the use of at least one silane-containing compound in a lubricating engine oil composition for preventing or reducing low speed pre-ignition in a direct injected, boosted, spark ignited internal combustion engine.

10 Claims, No Drawings

METHOD FOR PREVENTING OR REDUCING LOW SPEED PRE-IGNITION IN DIRECT INJECTED SPARK-IGNITED ENGINES WITH SILANE-CONTAINING LUBRICANT

FIELD OF THE INVENTION

This disclosure relates to a lubricant composition for a direct injected, boosted, spark ignited internal combustion engine that contains at least one silane compound. This disclosure also relates to a method for preventing or reducing low speed pre-ignition in an engine lubricated with a formulated oil. The formulated oil has a composition comprising at least one oil soluble or oil dispersible silane compound.

BACKGROUND OF THE INVENTION

In recent years, engine manufacturers have developed smaller engines which provide higher power densities and excellent performance while reducing frictional and pumping losses. This is accomplished by increasing boost pressures with the use of turbochargers or mechanical superchargers, and by down-speeding the engine by using higher transmission gear ratios allowed by higher torque generation at lower engine speeds. However, higher torque at lower engine speeds has been found to cause random pre-ignition in engines at low speeds, a phenomenon known as Low Speed Pre-Ignition, or LSPI, resulting in extremely high cylinder peak pressures, which can lead to catastrophic engine failure. The possibility of LSPI prevents engine manufacturers from fully optimizing engine torque at lower engine speed in such smaller, high-output engines.

One of the leading theories surrounding the cause of low speed pre-ignition (LSPI) is at least in part, due to auto-ignition of engine oil droplets that enter the engine combustion chamber from the piston crevice under high pressure, during periods in which the engine is operating at low speeds, and compression stroke time is longest (Amann et al. SAE 2012-01-1140). Although some engine knocking and pre-ignition problems can be and are being resolved through the use of new engine technology, such as electronic controls and knock sensors, and through the optimization of engine operating conditions, there is a need for lubricating oil compositions which can decrease or prevent the LSPI problem, and also improve or maintain other performance such as wear and oxidation protection.

The present inventors have discovered a solution for addressing the problem of LSPI through the use of silane-containing additives.

SUMMARY OF THE INVENTION

Disclosed is a lubricating engine oil composition for use in down-sized boosted engines comprising a lubricating oil base stock as a major component, and at least one silane-containing compound as a minor component; wherein the downsized engine ranges from 0.5 liters to 3.6 liters.

Also disclosed is a method for preventing or reducing low speed pre-ignition in a direct injected, boosted, spark ignited internal combustion engine, said method comprising the step of lubricating the crankcase of the engine with a lubricating oil composition comprising from about 100 to about 3000 ppm of silicon from at least one silane-containing compound, based on the total weight of the lubricating oil composition.

Further disclosed is the use of at least one silane-containing compound in a lubricating engine oil composition for preventing or reducing low speed pre-ignition in a direct injected, boosted, spark ignited internal combustion engine

DETAILED DESCRIPTION OF THE INVENTION

The term "boosting" is used throughout the specification. Boosting refers to running an engine at higher intake pressures than in naturally aspirated engines. A boosted condition can be reached by use of a turbocharger (driven by exhaust) or a supercharger (driven by the engine).

"Boosting" allow engine manufacturers to use smaller engines which provide higher power densities to provide excellent performance while reducing frictional and pumping losses.

Throughout the specification and claims the expression oil soluble or dispersible is used. By oil soluble or dispersible is meant that an amount needed to provide the desired level of activity or performance can be incorporated by being dissolved, dispersed or suspended in an oil of lubricating viscosity. Usually, this means that at least about 0.001% by weight of the material can be incorporated in a lubricating oil composition. For a further discussion of the terms oil soluble and dispersible, particularly "stably dispersible", see U.S. Pat. No. 4,320,019 which is expressly incorporated herein by reference for relevant teachings in this regard.

The term "sulfated ash" as used herein refers to the non-combustible residue resulting from detergents and metallic additives in lubricating oil. Sulfated ash may be determined using ASTM Test D874.

The term "Total Base Number" or "TBN" as used herein refers to the amount of base equivalent to milligrams of KOH in one gram of sample. Thus, higher TBN numbers reflect more alkaline products, and therefore a greater alkalinity. TBN was determined using ASTM D 2896 test. Unless otherwise specified, all percentages are in weight percent.

In general, the level of sulfur in the lubricating oil compositions of the present invention is less than or equal to about 0.7 wt. %, based on the total weight of the lubricating oil composition, e.g., a level of sulfur of about 0.01 wt. % to about 0.70 wt. %, 0.01 to 0.6 wt. %, 0.01 to 0.5 wt. %, 0.01 to 0.4 wt. %, 0.01 to 0.3 wt. %, 0.01 to 0.2 wt. %, 0.01 wt. % to 0.10 wt. %. In one embodiment, the level of sulfur in the lubricating oil compositions of the present invention is less than or equal to about 0.60 wt. %, less than or equal to about 0.50 wt. %, less than or equal to about 0.40 wt. %, less than or equal to about 0.30 wt. %, less than or equal to about 0.20 wt. %, less than or equal to about 0.10 wt. % based on the total weight of the lubricating oil composition.

In one embodiment, the levels of phosphorus in the lubricating oil compositions of the present invention is less than or equal to about 0.12 wt. %, based on the total weight of the lubricating oil composition, e.g., a level of phosphorus of about 0.01 wt. % to about 0.12 wt. %. In one embodiment, the levels of phosphorus in the lubricating oil compositions of the present invention is less than or equal to about 0.11 wt. %, based on the total weight of the lubricating oil composition, e.g., a level of phosphorus of about 0.01 wt. % to about 0.11 wt. %. In one embodiment, the levels of phosphorus in the lubricating oil compositions of the present invention is less than or equal to about 0.10 wt. %, based on the total weight of the lubricating oil composition, e.g., a level of phosphorus of about 0.01 wt. % to about 0.10 wt. %. In one embodiment, the levels of phosphorus in the lubricating oil compositions of the present invention is less than or equal to about 0.09 wt. %, based on the total weight of the lubricating oil composition, e.g., a level of phosphorus of about 0.01 wt. % to about 0.09 wt. %. In one embodiment, the levels of phosphorus in the lubricating oil compositions of the present invention is less than or equal to about 0.08 wt. %, based on the total weight of the lubricating oil composition, e.g., a level of phosphorus of about 0.01 wt. % to about 0.08 wt. %. In one embodiment, the levels of phosphorus in the lubricating oil compositions of the present invention is less than or equal to about 0.07 wt. %, based on the total weight of the lubricating oil composition, e.g., a level of phosphorus of about 0.01 wt. % to about 0.07 wt. %. In one embodiment, the levels of phosphorus in the lubricating oil compositions of the present invention is less than or equal to about 0.05 wt. %, based on the total weight of the lubricating oil composition, e.g., a level of phosphorus of about 0.01 wt. % to about 0.05 wt. %.

In one embodiment, the level of sulfated ash produced by the lubricating oil compositions of the present invention is less than or equal to about 1.60 wt. % as determined by ASTM D 874, e.g., a level of sulfated ash of from about 0.10 to about 1.60 wt. % as determined by ASTM D 874. In one embodiment, the level of sulfated ash produced by the lubricating oil compositions of the present invention is less than or equal to about 1.00 wt. % as determined by ASTM D 874, e.g., a level of sulfated ash of from about 0.10 to about 1.00 wt. % as determined by ASTM D 874. In one embodiment, the level of sulfated ash produced by the lubricating oil compositions of the present invention is less than or equal to about 0.80 wt. % as determined by ASTM D 874, e.g., a level of sulfated ash of from about 0.10 to about 0.80 wt. % as determined by ASTM D 874. In one embodiment, the level of sulfated ash produced by the lubricating oil compositions of the present invention is less than or equal to about 0.60 wt. % as determined by ASTM D 874, e.g., a level of sulfated ash of from about 0.10 to about 0.60 wt. % as determined by ASTM D 874.

Suitably, the present lubricating oil composition may have a total base number (TBN) of 4 to 15 mg KOH/g (e.g., 5 to 12 mg KOH/g, 6 to 12 mg KOH/g, or 8 to 12 mg KOH/g).

Low Speed Pre-Ignition is most likely to occur in direct-injected, boosted (turbocharged or supercharged), spark-ignited (gasoline) internal combustion engines that, in operation, generate a break mean effective pressure level of greater than about 15 bar (peak torque), such as at least about 18 bar, particularly at least about 20 bar at engine speeds of from about 1500 to about 2500 rotations per minute (rpm), such as at engine speeds of from about 1500 to about 2000 rpm. As used herein, break mean effective pressure (BMEP) is defined as the work accomplished during one engine cycle, divided by the engine swept volume; the engine torque normalized by engine displacement. The word "brake" denotes the actual torque/power available at the engine flywheel, as measured on a dynamometer. Thus, BMEP is a measure of the useful power output of the engine.

In one embodiment of the invention, the engine is operated at speeds between 500 rpm and 3000 rpm, or 800 rpm to 2800 rpm, or even 1000 rpm to 2600 rpm. Additionally, the engine may be operated with a break mean effective pressure of 10 bars to 30 bars, or 12 bars to 24 bars.

LSPI events, while comparatively uncommon, may be catastrophic in nature. Hence drastic reduction or even elimination of LSPI events during normal or sustained operation of a direct fuel injection engine is desirable. In one embodiment, the method of the invention is such that there are less than 150 LSPI events/million combustion cycles (can also be expressed as 15 LSPI events/100,000 combustion cycles) or less than 100 LSPI events/million combustion cycles or less than 70 LSPI events/million combustion cycles or less than 60 LSPI events/million combustion cycles or less than 50 LSPI events/million combustion cycles or less than 40 LSPI events/million combustion cycles, less than 30 LSPI events/million combustion cycles, less than 20 LSPI events/million combustion cycles, less than 10 LSPI events/million combustion cycles, or there may be 0 LSPI events/million combustion cycles.

Therefore, in an aspect the present disclosure provides a method for preventing or reducing low speed pre-ignition in a direct injected, boosted, spark ignited internal combustion engine, said method comprising the step of lubricating the crankcase of the engine with a lubricating oil composition comprising at least one silane-containing compound. In one embodiment, the amount of silicon from the at least one silane compound is from about 100 to about 3000 ppm, from about 200 to about 3000 ppm, from about 250 to about 2500 ppm, from about 300 to about 2500 ppm, from about 350 to about 2500 ppm, from about 400 ppm to about 2500 ppm, from about 500 to about 2500 ppm, from about 600 to about 2500 ppm, from about 700 to about 2500 ppm, from about 700 to about 2000 ppm, from about 700 to about 1500 ppm in the lubricating oil composition. In one embodiment, the amount of silicon from the silane-containing compound is no more than about 2000 ppm or no more than 1500 ppm in the lubricating oil composition.

In one embodiment, the method of the invention provides a reduction in the number of LSPI events of at least 10 percent, or at least 20 percent, or at least 30 percent, or at least 50 percent, or at least 60 percent, or at least 70 percent, or at least 80 percent, or at least 90 percent, or at least 95 percent, compared to an oil that does not contain the at least one silane-containing compound.

In another aspect, the present disclosure provides a method for reducing the severity of low speed pre-ignition events in a direct injected, boosted, spark ignited internal combustion engine, said method comprising the step of lubricating the crankcase of the engine with a lubricating oil composition comprising at least one silane-containing compound. LSPI events are determined by monitoring peak cylinder pressure (PP) and mass fraction burn (MFB) of the fuel charge in the cylinder. When either or both criteria are met, it can be said that an LSPI event has occurred. The threshold for peak cylinder pressure varies by test, but is typically 4-5 standard deviations above the average cylinder pressure. Likewise, the MFB threshold is typically 4-5 standard deviations earlier than the average MFB (represented in crank angle degrees). LSPI events can be reported as average events per test, events per 100,000 combustion cycles, events per cycle, and/or combustion cycles per event. In one embodiment, the number of LSPI events, where both MFB02 and Peak Pressure (PP) Requirements that were greater than 90 bar of pressure, is less than 15 events, less than 14 events, less than 13 events, less than 12 events, less than 11 events, less than 10 events, less than 9 events, less than 8 events, less than 7 events, less than 6 events, is less than 5 events, less than 4 events, less than 3 events, less than 2 events, or less than 1 event per 100,000 combustion cycles. In one embodiment, the number of LSPI events that were greater than 90 bar was zero events, or in other words completely suppressed LSPI events greater than 90 bar. In one embodiment, the number of LSPI events where both MFB02 and Peak Pressure (PP) Requirements that were greater than 100 bar of pressure is less than 15 events, less than 14 events, less than 13 events, less than 12 events, less than 11 events, less than 10 events, less than 9 events, less than 8 events, less than 7 events, less than 6 events, is less than 5 events, less than 4 events, less than 3 events, less than 2 events, or less than 1 event per 100,000 combustion cycles. In one embodiment, the number of LSPI events that were greater than 100 bar was zero events, or in other words completely suppressed LSPI events greater than 100 bar. In one embodiment, the number of LSPI events where both MFB02 and Peak Pressure (PP) Requirements that were greater than 110 bar of pressure is less than 15 events, less than 14 events, less than 13 events, less than 12 events, less than 11 events, less than 10 events, less than 9 events, less than 8 events, less than 7 events, less than 6 events, is less than 5 events, less than 4 events, less than 3 events, less than 2 events, or less than 1 event per 100,000 combustion cycles In one embodiment, the number of LSPI events that were greater than 110 bar was zero events, or in other words completely suppressed LSPI events greater than 110 bar. For example, the number of LSPI events where both MFB02 and Peak Pressure (PP) Requirements that were greater than 120 bar of pressure is less than 15 events, less than 14 events, less than 13 events, less than 12 events, less than 11 events, less than 10 events, less than 9 events, less than 8 events, less than 7 events, less than 6 events, is less than 5 events, less than 4 events, less than 3 events, less than 2 events, or less than 1 event per 100,000 combustion cycles. In one embodiment, the number of LSPI events that were greater than 120 bar was zero events, or in other words completely suppressed very severe LSPI events (i.e., events greater than 120 bar).

It has now been found that the occurrence of LSPI in engines susceptible to the occurrence of LSPI can be reduced by lubricating such engines with lubricating oil compositions containing a silane-containing compound.

The disclosure further provides the method described herein in which the engine is fueled with a liquid hydrocarbon fuel, a liquid nonhydrocarbon fuel, or mixtures thereof.

The disclosure further provides the method described herein in which the engine is fueled by natural gas, liquefied petroleum gas (LPG), compressed natural gas (CNG), or mixtures thereof.

Lubricating oil compositions suitable for use as passenger car motor oils conventionally comprise a major amount of oil of lubricating viscosity and minor amounts of performance enhancing additives, including ash-containing compounds. Conveniently, silicon is introduced into the lubricating oil compositions used in the practice of the present disclosure by one or more silane-containing compounds.

Oil of Lubricating Viscosity/Base Oil Component

The oil of lubricating viscosity for use in the lubricating oil compositions of this disclosure, also referred to as a base oil, is typically present in a major amount, e.g., an amount of greater than 50 wt. %, preferably greater than about 70 wt. %, more preferably from about 80 to about 99.5 wt. % and most preferably from about 85 to about 98 wt. %, based on the total weight of the composition. The expression "base oil" as used herein shall be understood to mean a base stock or blend of base stocks which is a lubricant component that is produced by a single manufacturer to the same specifications (independent of feed source or manufacturer's location); that meets the same manufacturer's specification; and that is identified by a unique formula, product identification number, or both. The base oil for use herein can be any presently known or later-discovered oil of lubricating viscosity used in formulating lubricating oil compositions for any and all such applications, e.g., engine oils, marine cylinder oils, functional fluids such as hydraulic oils, gear oils, transmission fluids, etc. Additionally, the base oils for use herein can optionally contain viscosity index improvers, e.g., polymeric alkylmethacrylates; olefinic copolymers, e.g., an ethylene-propylene copolymer or a styrene-diene copolymer; and the like and mixtures thereof.

As one skilled in the art would readily appreciate, the viscosity of the base oil is dependent upon the application. Accordingly, the viscosity of a base oil for use herein will ordinarily range from about 2 to about 2000 centistokes (cSt) at 100° Centigrade (C.). Generally, individually the base oils used as engine oils will have a kinematic viscosity range at 100° C. of about 2 cSt to about 30 cSt, preferably about 3 cSt to about 16 cSt, and most preferably about 4 cSt to about 12 cSt and will be selected or blended depending on the desired end use and the additives in the finished oil to give the desired grade of engine oil, e.g., a lubricating oil composition having an SAE Viscosity Grade of 0W, 0W-4, 0W-8, 0W-12, 0W-16, 0W-20, 0W-26, 0W-30, 0W-40, 0W-50, 0W-60, 5W, 5W-20, 5W-30, 5W-40, 5W-50, 5W-60, 10W, 10W-20, 10W-30, 10W-40, 10W-50, 15W, 15W-20, 15W-30, 15W-40, 30, 40 and the like.

Group I base oils generally refer to a petroleum derived lubricating base oil having a saturates content of less than 90 wt. % (as determined by ASTM D 2007) and/or a total sulfur content of greater than 300 ppm (as determined by ASTM D 2622, ASTM D 4294, ASTM D 4297 or ASTM D 3120) and has a viscosity index (VI) of greater than or equal to 80 and less than 120 (as determined by ASTM D 2270).

Group II base oils generally refer to a petroleum derived lubricating base oil having a total sulfur content equal to or less than 300 parts per million (ppm) (as determined by ASTM D 2622, ASTM D 4294, ASTM D 4927 or ASTM D 3120), a saturates content equal to or greater than 90 weight percent (as determined by ASTM D 2007), and a viscosity index (VI) of between 80 and 120 (as determined by ASTM D 2270).

Group III base oils generally refer to a petroleum derived lubricating base oil having less than 300 ppm sulfur, a saturates content greater than 90 weight percent, and a VI of 120 or greater.

Group IV base oils are polyalphaolefins (PAOs).

Group V base oils include all other base oils not included in Group I, II, III, or IV.

The lubricating oil composition can contain minor amounts of other base oil components. For example, the lubricating oil composition can contain a minor amount of a base oil derived from natural lubricating oils, synthetic lubricating oils or mixtures thereof. Suitable base oil includes base stocks obtained by isomerization of synthetic wax and slack wax, as well as hydrocracked base stocks produced by hydrocracking (rather than solvent extracting) the aromatic and polar components of the crude.

Suitable natural oils include mineral lubricating oils such as, for example, liquid petroleum oils, solvent-treated or acid-treated mineral lubricating oils of the paraffinic, naphthenic or mixed paraffinic-naphthenic types, oils derived from coal or shale, animal oils, vegetable oils (e.g., rapeseed oils, castor oils and lard oil), and the like.

Suitable synthetic lubricating oils include, but are not limited to, hydrocarbon oils and halo-substituted hydrocarbon oils such as polymerized and interpolymerized olefins, e.g., polybutylenes, polypropylenes, propylene-isobutylene copolymers, chlorinated polybutylenes, poly(1-hexenes), poly(1-octenes), poly(1-decenes), and the like and mixtures thereof; alkylbenzenes such as dodecylbenzenes, tetradecylbenzenes, dinonylbenzenes, di(2-ethylhexyl)-benzenes, and the like; polyphenyls such as biphenyls, terphenyls, alkylated polyphenyls, and the like; alkylated diphenyl ethers and alkylated diphenyl sulfides and the derivative, analogs and homologs thereof and the like.

Other synthetic lubricating oils include, but are not limited to, oils made by polymerizing olefins of less than 5 carbon atoms such as ethylene, propylene, butylenes, isobutene, pentene, and mixtures thereof. Methods of preparing such polymer oils are well known to those skilled in the art.

Additional synthetic hydrocarbon oils include liquid polymers of alpha olefins having the proper viscosity. Especially useful synthetic hydrocarbon oils are the hydrogenated liquid oligomers of $C_6$ to $C_{12}$ alpha olefins such as, for example, 1-decene trimer.

Another class of synthetic lubricating oils include, but are not limited to, alkylene oxide polymers, i.e., homopolymers, interpolymers, and derivatives thereof where the terminal hydroxyl groups have been modified by, for example, esterification or etherification. These oils are exemplified by the oils prepared through polymerization of ethylene oxide or propylene oxide, the alkyl and phenyl ethers of these polyoxyalkylene polymers (e.g., methyl poly propylene glycol ether having an average molecular weight of 1,000, diphenyl ether of polyethylene glycol having a molecular weight of 500-1000, diethyl ether of polypropylene glycol having a molecular weight of 1,000-1,500, etc.) or mono- and polycarboxylic esters thereof such as, for example, the acetic esters, mixed $C_3$-$C_8$ fatty acid esters, or the $C_{13}$ oxo acid diester of tetraethylene glycol.

Yet another class of synthetic lubricating oils include, but are not limited to, the esters of dicarboxylic acids e.g., phthalic acid, succinic acid, alkyl succinic acids, alkenyl succinic acids, maleic acid, azelaic acid, suberic acid, sebacic acid, fumaric acid, adipic acid, linoleic acid dimer, malonic acids, alkyl malonic acids, alkenyl malonic acids, etc., with a variety of alcohols, e.g., butyl alcohol, hexyl alcohol, dodecyl alcohol, 2-ethylhexyl alcohol, ethylene glycol, diethylene glycol monoether, propylene glycol, etc. Specific examples of these esters include dibutyl adipate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include, but are not limited to, those made from carboxylic acids having from about 5 to about 12 carbon atoms with alcohols, e.g., methanol, ethanol, etc., polyols and polyol ethers such as neopentyl glycol, trimethylol propane, pentaerythritol, dipentaerythritol, tripentaerythritol, and the like.

Silicon-based oils such as, for example, polyalkyl-, polyaryl-, polyalkoxy- or polyaryloxy-siloxane oils and silicate oils, comprise another useful class of synthetic lubricating oils. Specific examples of these include, but are not limited to, tetraethyl silicate, tetra-isopropyl silicate, tetra-(2-ethylhexyl) silicate, tetra-(4-methyl-hexyl)silicate, tetra-(p-tert-butylphenyl)silicate, hexyl-(4-methyl-2-pentoxy)disiloxane, poly(methyl)siloxanes, poly(methylphenyl)siloxanes, and the like. Still yet other useful synthetic lubricating oils include, but are not limited to, liquid esters of phosphorous containing acids, e.g., tricresyl phosphate, trioctyl phosphate, diethyl ester of decane phosphonic acid, etc., polymeric tetrahydrofurans and the like.

The lubricating oil may be derived from unrefined, refined and rerefined oils, either natural, synthetic or mixtures of two or more of any of these of the type disclosed hereinabove. Unrefined oils are those obtained directly from a natural or synthetic source (e.g., coal, shale, or tar sands bitumen) without further purification or treatment. Examples of unrefined oils include, but are not limited to, a shale oil obtained directly from retorting operations, a petroleum oil obtained directly from distillation or an ester oil obtained directly from an esterification process, each of which is then used without further treatment. Refined oils are similar to the unrefined oils except they have been further treated in one or more purification steps to improve one or more properties. These purification techniques are known to those of skill in the art and include, for example, solvent extractions, secondary distillation, acid or base extraction, filtration, percolation, hydrotreating, dewaxing, etc. Rerefined oils are obtained by treating used oils in processes similar to those used to obtain refined oils. Such rerefined oils are also known as reclaimed or reprocessed oils and often are additionally processed by techniques directed to removal of spent additives and oil breakdown products.

Lubricating oil base stocks derived from the hydroisomerization of wax may also be used, either alone or in combination with the aforesaid natural and/or synthetic base stocks. Such wax isomerate oil is produced by the hydroisomerization of natural or synthetic waxes or mixtures thereof over a hydroisomerization catalyst.

Natural waxes are typically the slack waxes recovered by the solvent dewaxing of mineral oils; synthetic waxes are typically the wax produced by the Fischer-Tropsch process.

Other useful fluids of lubricating viscosity include non-conventional or unconventional base stocks that have been processed, preferably catalytically, or synthesized to provide high performance lubrication characteristics.

Silane Compound

The lubrication oil compositions herein can contain one or more silane-containing compounds.

In one embodiment, the silane can have the following generic formula (I):

$$[(R^1)_{3-a}(R^2O)_a Si]_r A \qquad (I),$$

wherein $R^1$ is selected from the group consisting of saturated and unsaturated hydrocarbyl and chain-substituted saturated and unsaturated hydrocarbyl; $R^2$ is selected from the group consisting of hydrogen, saturated and unsaturated hydrocarbyl and chain-substituted saturated and unsaturated hydrocarbyl; a is an integer from 1 to 3, and A is a group of valence r, r being an integer greater than or equal to 1, selected from the group consisting of saturated and unsaturated, linear, branched, or cyclic hydrocarbyl groups, an oxygen atom, or a linear, branched, or cyclic siloxane or polysiloxane group, each of which, except for an oxygen atom, optionally comprises substituents having oxygen, nitrogen, sulfur, or halogen heteroatoms.

A preferred class of silanes are those corresponding to formula (I) wherein r is 1, as well as oligomers thereof formed by hydrolysis, hydrosilylation or polymerization. If r is 1, A is preferably a saturated or unsaturated, linear, branched, or cyclic hydrocarbyl group, optionally containing an N-bonded group, e.g., amine, imine, carbamate, thiocarbamate, isocyanate, isocyanurate, and the like; an O-bonded group, e.g., ester, ether, polyether group, and the like; an S-bonded group, e.g., mercaptan, blocked mercaptan, thioether, thioester, sulfide, polysulfide, and the like; or a C-bonded group, e.g., carbonyl or a carbonyl derivative, such as acetal, ketal, thioketal and the like, nitrile, cyanate, thiocyanate, and the like. Preferably, where r is 1, A is selected from the group linear or branched hydrocarbyl radicals containing 1 to 24 carbon atoms, including methyl, ethyl, propyl, butyl, hexyl, octyl, nonyl, methylethyl, methylpropyl, methylbutyl, decyl, dodecyl, diethylenylbenzyl, and the like. More preferably, where r is 1, A is selected from linear or branched hydrocarbyl radicals from 2 to 18 carbon atoms, and most preferably, from 4 to 12 carbon atoms.

In one embodiment, the silane are those corresponding to formula (I) wherein r is 2. Such additives correspond to the general formula (II):

$$(R^1_{3-a})(R^2O)_a\text{—Si—B—Si—}(OR^2)_a(R^1_{3-a}) \quad \text{(II)}$$

wherein $R^1$, $R^2$, and a are as defined above for formula (I) and B is a divalent group selected from the group consisting of a saturated or unsaturated, linear, branched, or cyclic hydrocarbyl group, an oxygen atom, a linear, branched, or cyclic siloxane or polysiloxane group, each of which, except for an oxygen atom, optionally comprises substituents having oxygen, nitrogen, sulfur, halogen heteroatoms. $(CR^4R^5)_b(CR^6R^7)_c$, $C_bH_{2b}$—X'—$C_cH_{2c}$, $(CR^4R^5)_p$—X'—$(CR^6R^7)_q$, and cyclo $C_sH_q(C_bH_{2b})_t$, wherein $R^4$, $R^5$, $R^6$, and $R^7$ are the same or different and are independently selected from the group consisting of hydrogen, saturated and unsaturated hydrocarbyl, and saturated and unsaturated chain-substituted hydrocarbyl, b, c, p, and q are integers independently selected from 1 to 18, s in an integer greater than 2, t is an integer greater than 1, a is an integer from 1 to 3 and X' is selected from the group consisting of:

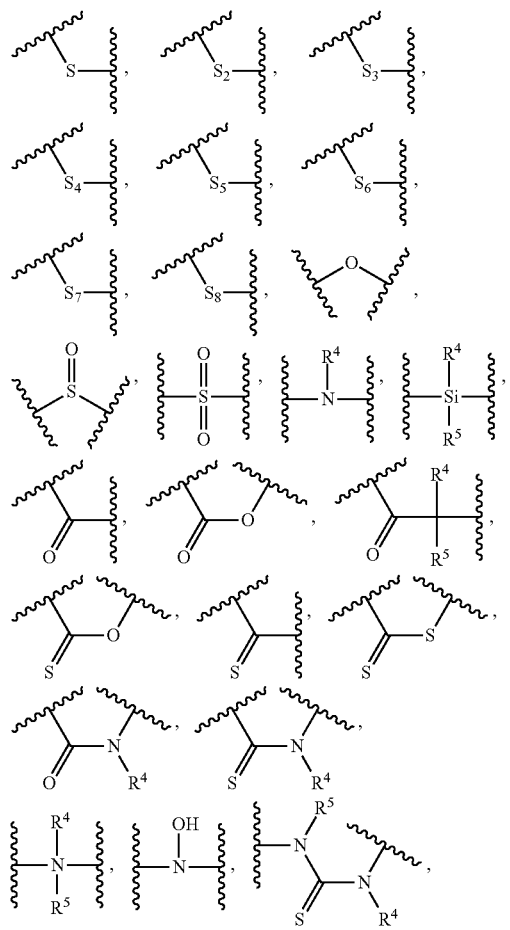

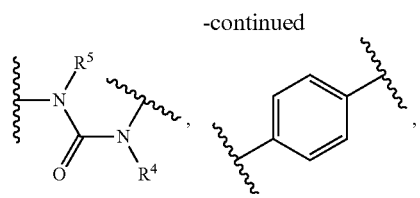

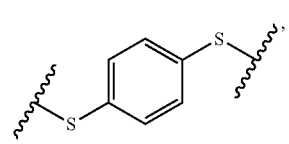

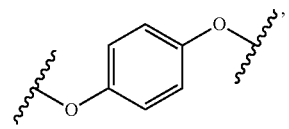

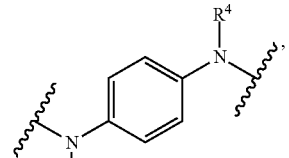

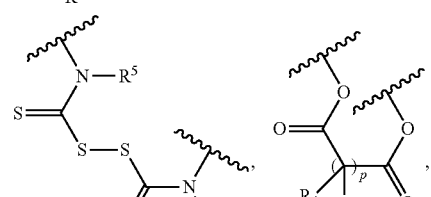

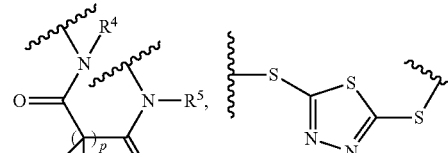

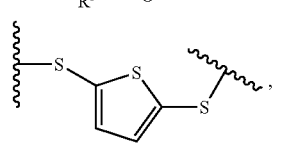

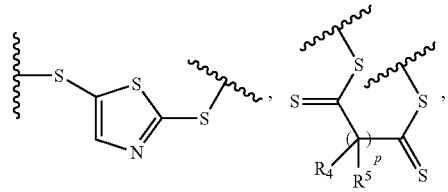

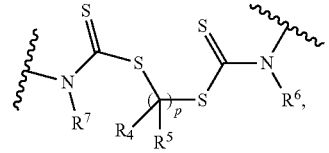

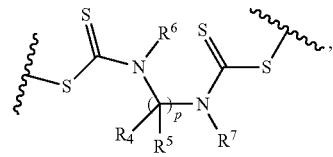

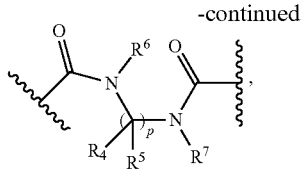

and mixtures thereof, wherein $R^4$, $R^5$, $R^6$ and $R^7$ are independently the same or different and are as defined above. More preferably, where r is 2, A is a dialkylene polysulfide unit, $CH_2CH_2CH_2S_uCH_2CH_2CH_2$, where u is an integer of 1 to 10, most preferably an average value of 2 or 4. In one embodiment, a is 3.

Preferably X' contains a sulfur atom. In one embodiment, X' is selected from:

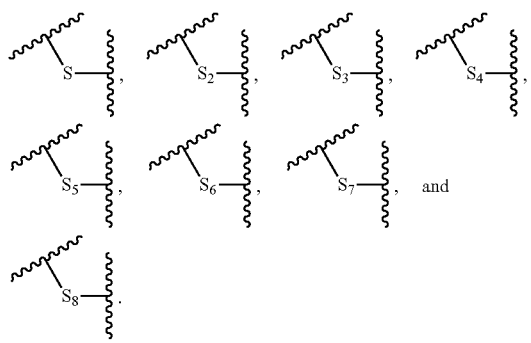

In general formulas (I) and (II). $R^1$ and $R^2$ are preferably independently selected from the group consisting of $C_1$-$C_{18}$ alkyl, aryl, alkaryl, alkoxyaryl, alkoxyalkyl, and alkylthioalkyl.

More preferably, $R^1$ and $R^2$ are independently selected from the group consisting of $C_1$-$C_8$ linear, branched, or cyclic alkyl, such as methyl, ethyl, propyl, butyl, pentyl, hexyl, heptyl, octyl, isopropyl, isobutyl, isopentyl, isoheptyl, isooctyl, sec-butyl, 1-methylbutyl, 1-ethylpropyl, cyclopropyl, cyclobutyl, cyclopentyl, cyclohexyl, cyclooctyl, and the like; aryl, alkaryl, alkoxyaryl, or alkoxyalkyl, such as phenyl, tolyl, xylyl, benzyl, methoxyphenyl, methoxymethyl, methoxyethyl, ethoxymethyl, ethoxyethyl, and the like, and ethylthiomethyl, methythioethyl, and the like.

Even more preferably, $R^1$ and $R^2$ are independently selected from the group consisting of methyl, ethyl, propyl, butyl, pentyl, isopropyl, isobutyl, isopentyl, sec-butyl, 1-methylbutyl, 1-ethylpropyl, cyclopentyl, cyclohexyl, phenyl, tolyl, benzyl, and methoxyethyl.

Most preferably, $R^1$ and $R^2$ are independently selected from the group consisting of methyl and ethyl.

Preferably, $R^4$, $R^5$, $R^6$ and $R^7$ are independently selected from the group consisting of hydrogen, $C_1$-$C_{18}$ alkyl, aryl, alkaryl, alkoxyaryl, alkoxyalkyl, and alkylthioalkyl.

More preferably $R^4$, $R^5$, $R^6$ and $R^7$ are independently selected from the group consisting of hydrogen, $C_1$-$C_8$ linear, branched, or cyclic alkyl, such as methyl, ethyl, propyl, butyl, pentyl, hexyl, heptyl, octyl, isopropyl, isobutyl, isopentyl, isoheptyl, isooctyl, sec-butyl, 1-methylbutyl, 1-ethylpropyl, cyclopropyl, cyclobutyl, cyclopentyl, cyclohexyl, cyclooctyl, and the like; aryl, alkaryl, alkoxyaryl, or alkoxyalkyl, such as phenyl, tolyl, xylyl, benzyl, methoxyphenyl, methoxymethyl, methoxyethyl, ethoxymethyl, ethoxyethyl, and the like; and ethylthiomethyl, methylthioethyl, and the like.

Still more preferably, $R^4$, $R^5$, $R^6$ and $R^7$ are independently selected from the group consisting of hydrogen, methyl, ethyl, propyl, butyl, pentyl, isopropyl, isobutyl, isopentyl, sec-butyl, 1-methylbutyl, 1-ethylpropyl, cyclopentyl, cyclohexyl, phenyl, tolyl, benzyl, and methoxyethyl.

$R^4$, $R^5$, $R^6$ and $R^7$ are most preferably all hydrogen.

Also preferred are polyvalent versions of A, such as isomers of triethylenylcyclohexane, $(CH_2CH_2)_3C_6H_9$, where r is 3.

Examples of silanes of the present disclosure include, but are not limited to, bis(3-triethoxysilyl-1 propyl) tetrasulfide; bis(3-triethoxysilyl-1-propyl) disulfide; 1,2-bis-(triethoxysilyl) ethane; 1,4-bis-(triethoxysilyl) butane; 1,6-bis-(triethoxsilyl) hexane octyl triethoxysilane; and 1,2,4-tris-(2-trimethoxysilylethyl)cyclohexane.

In one embodiment, the silane of the present disclosure also includes at least one sulfur atom in the molecule.

Other depictions of silanes with two Si containing moieties are given in U.S. Pat. Nos. 6,127,468 and 6,359,046, incorporated by reference herein.

Oligomeric silane structures and their preparation are described in U.S. Pat. Nos. 4,950,779 and 6,140,445, incorporated by reference herein.

References for the preparation of monomeric silanes are described in "Chemistry and Technology of Silicones", W. Noll, 1968, Academic Press, New York or "Silane Coupling Agents, Second Ed.", E. Pleuddemann, 1991, Plenum Publishing, New York, incorporated by reference herein.

Processes to make sulfur silanes can be found in U.S. Pat. Nos. 5,596,116 and 5,489,701, which, along with the references included therein and the above references, are incorporated herein by reference.

Examples of suitable commercial silane additives are shown below:

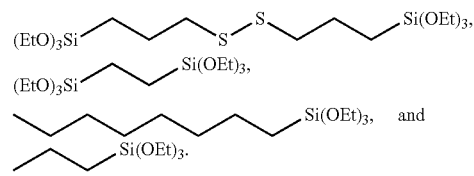

Generally, the amount of the silane-containing compound can be from about 0.001 wt. % to about 25 wt. %, from about 0.05 wt. % to about 20 wt. %, or from about 0.1 wt. % to about 15 wt. %, or from about 0.1 wt. % to about 5 wt. %, from about, 0.1 wt. % to about 4.0 wt. %, based on the total weight of the lubricating oil composition.

In an aspect, the present disclosure provides a lubricating engine oil composition for a direct injected, boosted, spark ignited internal combustion engine comprising at least one silicon-containing compound. In one embodiment, the amount of silicon from the at least one silane-containing compound is from about 100 to about 3000 ppm, from about 200 to about 3000 ppm, from about 200 to about 2500 ppm, from about 200 to about 2000 ppm, from about 200 to about 1500 ppm, or from about 250 to about 2500 ppm, or from about 250 to about 2000 ppm, or from about 250 to about 1500 ppm, or from about 250 to about 1200 ppm, from about 300 to about 2500 ppm, from about 350 to about 2500 ppm, from about 400 ppm to about 2500 ppm, from about 500 to about 2500 ppm, from about 600 to about 2500 ppm, from about 700 to about 2500 ppm, from about 700 to about 2000 ppm, from about 700 to about 1500 ppm based on the total weight of the lubricating oil composition. In one embodiment, the amount of silicon from the silane-containing compound is no more than about 2000 ppm or no more than about 1500 ppm, based on the total weight of the lubricating oil composition.

In one embodiment, the silane-containing compound can be combined with conventional lubricating oil detergent additives which contain magnesium and/or calcium. In one embodiment the calcium detergent(s) can be added in an amount sufficient to provide the lubricating oil composition from 0 to about 2400 ppm of calcium metal, from 0 to about 2200 ppm of calcium metal, from 100 to about 2000 ppm of calcium metal, from 200 to about 1800 ppm of calcium metal, or from about 100 to about 1800 ppm, or from about 200 to about 1500 ppm, or from about 300 to about 1400 ppm, or from about 400 to about 1400 ppm, of calcium metal in the lubricating oil composition. In one embodiment the magnesium detergent(s) can be added in an amount sufficient to provide the lubricating oil composition from about 100 to about 1000 ppm of magnesium metal, or from about 100 to about 600 ppm, or from about 100 to about 500 ppm, or from about 200 to about 500 ppm of magnesium metal in the lubricating oil composition.

In one embodiment, the silane-containing compound can be combined with conventional lubricating oil detergent additives which contain lithium. In one embodiment the lithium detergent(s) can be added in an amount sufficient to provide the lubricating oil composition from 0 to about 2400 ppm of lithium metal, from 0 to about 2200 ppm of lithium metal, from 100 to about 2000 ppm of lithium metal, from 200 to about 1800 ppm of lithium metal, or from about 100 to about 1800 ppm, or from about 200 to about 1500 ppm, or from about 300 to about 1400 ppm, or from about 400 to about 1400 ppm, of lithium metal in the lubricating oil composition.

In one embodiment, the silane-containing compound can be combined with conventional lubricating oil detergent additives which contain sodium. In one embodiment the sodium detergent(s) can be added in an amount sufficient to provide the lubricating oil composition from 0 to about 2400 ppm of sodium metal, from 0 to about 2200 ppm of sodium metal, from 100 to about 2000 ppm of sodium metal, from 200 to about 1800 ppm of sodium metal, or from about 100 to about 1800 ppm, or from about 200 to about 1500 ppm, or from about 300 to about 1400 ppm, or from about 400 to about 1400 ppm, of sodium metal in the lubricating oil composition.

In one embodiment, the silane-containing compound can be combined with conventional lubricating oil detergent additives which contain potassium. In one embodiment the potassium detergent(s) can be added in an amount sufficient to provide the lubricating oil composition from 0 to about 2400 ppm of potassium metal, from 0 to about 2200 ppm of potassium metal, from 100 to about 2000 ppm of potassium metal, from 200 to about 1800 ppm of potassium metal, or from about 100 to about 1800 ppm, or from about 200 to about 1500 ppm, or from about 300 to about 1400 ppm, or from about 400 to about 1400 ppm, of potassium metal in the lubricating oil composition.

In one embodiment, the disclosure provides a lubricating engine oil composition comprising a lubricating oil base stock as a major component; and at least one silane-containing compound, as a minor component; and wherein the engine exhibits greater than 50% reduced low speed pre-ignition, based on normalized low speed pre-ignition (LSPI) counts per 100,000 engine cycles, engine operation at between 500 and 3,000 revolutions per minute and brake mean effective pressure (BMEP) between 10 and 30 bar, as compared to low speed pre-ignition performance achieved in an engine using a lubricating oil that does not comprise the at least one silane-containing compound.

In one aspect, the disclosure provides a lubricating engine oil composition for use in a down-sized boosted engine comprising a lubricating oil base stock as a major component; and at least one silane-containing compound, as a minor component; where the downsized engine ranges from about 0.5 to about 3.6 liters, from about 0.5 to about 3.0 liters, from about 0.8 to about 3.0 liters, from about 0.5 to about 2.0 liters, or from about 1.0 to about 2.0 liters. The engine can have two, three, four, five or six cylinders.

In an aspect, the present disclosure provides the use of a at least one silane-containing compound for preventing or reducing low speed pre-ignition in a direct injected, boosted, spark ignited internal combustion engine.

Lubricating Oil Additives

In addition to the silane compound described herein, the lubricating oil composition can comprise additional lubricating oil additives.

The lubricating oil compositions of the present disclosure may also contain other conventional additives that can impart or improve any desirable property of the lubricating oil composition in which these additives are dispersed or dissolved. Any additive known to a person of ordinary skill in the art may be used in the lubricating oil compositions disclosed herein. Some suitable additives have been described in Mortier et al., "Chemistry and Technology of Lubricants", 2nd Edition, London, Springer, (1996); and Leslie R. Rudnick, "Lubricant Additives: Chemistry and Applications", New York, Marcel Dekker (2003), both of which are incorporated herein by reference. For example, the lubricating oil compositions can be blended with antioxidants, anti-wear agents, metal detergents, rust inhibitors, dehazing agents, demulsifying agents, metal deactivating agents, friction modifiers, pour point depressants, antifoaming agents, co-solvents, corrosion-inhibitors, ashless dispersants, multifunctional agents, dyes, extreme pressure agents and the like and mixtures thereof. A variety of the additives are known and commercially available. These additives, or their analogous compounds, can be employed for the preparation of the lubricating oil compositions of the disclosure by the usual blending procedures.

The lubricating oil composition of the present invention can contain one or more detergents. Metal-containing or ash-forming detergents function as both detergents to reduce or remove deposits and as acid neutralizers or rust inhibitors, thereby reducing wear and corrosion and extending engine life. Detergents generally comprise a polar head with a long hydrophobic tail. The polar head comprises a metal salt of an acidic organic compound. The salts may contain a substantially stoichiometric amount of the metal in which case they are usually described as normal or neutral salts. A large amount of a metal base may be incorporated by reacting excess metal compound (e.g., an oxide or hydroxide) with an acidic gas (e.g., carbon dioxide).

Detergents that may be used include oil-soluble neutral and overbased sulfonates, phenates, sulfurized phenates, thiophosphonates, salicylates, and naphthenates and other oil-soluble carboxylates of a metal, particularly the alkali or alkaline earth metals, e.g., barium, sodium, potassium, lithium, calcium, d magnesium. The mostcommonly used metals are calcium and magnesium, which may both be present in detergents used in a lubricant, and mixtures of calcium and/or magnesium with sodium.

The lubricating oil composition of the present invention can contain one or more anti-wear agents that can reduce friction and excessive wear. Any anti-wear agent known by a person of ordinary skill in the art may be used in the lubricating oil composition. Non-limiting examples of suitable anti-wear agents include zinc dithiophosphate, metal (e.g., Pb, Sb, Mo and the like) salts of dithiophosphates, metal (e.g., Zn, Pb, Sb, Mo and the like) salts of dithiocarbamates, metal (e.g., Zn, Pb, Sb and the like) salts of fatty acids, boron compounds, phosphate esters, phosphite esters, amine salts of phosphoric acid esters or thiophosphoric acid esters, reaction products of dicyclopentadiene and thiophosphoric acids and combinations thereof. The amount of the anti-wear agent may vary from about 0.01 wt. % to about 5 wt. %, from about 0.05 wt. % to about 3 wt. %, or from about 0.1 wt. % to about 1 wt. %, based on the total weight of the lubricating oil composition.

In certain embodiments, the anti-wear agent is or comprises a dihydrocarbyl dithiophosphate metal salt, such as zinc dialkyl dithiophosphate compounds. The metal of the dihydrocarbyl dithiophosphate metal salt may be an alkali or alkaline earth metal, or aluminum, lead, tin, molybdenum, manganese, nickel or copper. In some embodiments, the metal is zinc. In other embodiments, the alkyl group of the dihydrocarbyl dithiophosphate metal salt has from about 3 to about 22 carbon atoms, from about 3 to about 18 carbon atoms, from about 3 to about 12 carbon atoms, or from about 3 to about 8 carbon atoms. In further embodiments, the alkyl group is linear or branched.

The amount of the dihydrocarbyl dithiophosphate metal salt including the zinc dialkyl dithiophosphate salts in the lubricating oil composition disclosed herein is measured by its phosphorus content. In some embodiments, the phosphorus content of the lubricating oil composition disclosed herein is from about 0.01 wt. % to about 0.14 wt. %, based on the total weight of the lubricating oil composition.

The lubricating oil composition of the present invention can contain one or more friction modifiers that can lower the friction between moving parts. Any friction modifier known by a person of ordinary skill in the art may be used in the lubricating oil composition. Non-limiting examples of suitable friction modifiers include fatty carboxylic acids; derivatives (e.g., alcohol, esters, borated esters, amides, metal salts and the like) of fatty carboxylic acid; mono-, di- or tri-alkyl substituted phosphoric acids or phosphonic acids; derivatives (e.g., esters, amides, metal salts and the like) of mono-, di- or tri-alkyl substituted phosphoric acids or phosphonic acids; mono-, di- or tri-alkyl substituted amines; mono- or di-alkyl substituted amides and combinations thereof. In some embodiments examples of friction modifiers include, but are not limited to, alkoxylated fatty amines; borated fatty epoxides; fatty phosphites, fatty epoxides, fatty amines, borated alkoxylated fatty amines, metal salts of fatty acids, fatty acid amides, glycerol esters, borated glycerol esters; and fatty imidazolines as disclosed in U.S. Pat. No. 6,372,696, the contents of which are incorporated by reference herein; friction modifiers obtained from a reaction product of a $C_4$ to $C_{75}$, or a $C_6$ to $C_{24}$, or a $C_6$ to $C_{20}$, fatty acid ester and a nitrogen-containing compound selected from the group consisting of ammonia, and an alkanolamine and the like and mixtures thereof. The amount of the friction modifier may vary from about 0.01 wt. % to about 10 wt. %, from about 0.05 wt. % to about 5 wt. %, or from about 0.1 wt. % to about 3 wt. %, based on the total weight of the lubricating oil composition.

The lubricating oil composition of the disclosure can contain a molybdenum-containing friction modifier. The molybdenum-containing friction modifier can be any one of the known molybdenum-containing friction modifiers or the known molybdenum-containing friction modifier compositions.

Preferred molybdenum-containing friction modifier is, for example, sulfurized oxymolybdenum dithiocarbamate, sulfurized oxymolybdenum dithiophosphate, amine-molybdenum complex compound, oxymolybdenum diethylate amide, and oxymolybdenum monoglyceride. Most preferred is a molybdenum dithiocarbamate friction modifier.

The lubricating oil composition of the invention generally contains the molybdenum-containing friction modifier in an amount of 0.01 to 0.15 wt. % in terms of the molybdenum content.

The lubricating oil composition of the invention preferably contains an organic oxidation inhibitor in an amount of 0.01-5 wt. %, preferably 0.1-3 wt. %. The oxidation inhibitor can be a hindered phenol oxidation inhibitor or a diarylamine oxidation inhibitor. The diarylamine oxidation inhibitor is advantageous in giving a base number originating from the nitrogen atoms. The hindered phenol oxidation inhibitor is advantageous in producing no NOx gas. Examples of the hindered phenol oxidation inhibitors include 2,6-di-t-butyl-p-cresol, 4,4'-methylenebis(2,6-di-t-butylphenol), 4,4'-methylenebis(6-t-butyl-o-cresol), 4,4'-isopropylidenebis(2,6-di-t-butylphenol), 4,4'-bis(2,6-di-t-butylphenol), 2,2'-methylenebis(4-methyl-6-t-butylphenol), 4,4'-thiobis(2-methyl-6-t-butylphenol), 2,2-thio-diethylenebis[3-(3,5-di-t-butyl-4-hydroxyphenyl)propionate], octyl 3-(3,5-di-t-butyl-4-hydroxyphenyl)propionate, octadecyl 3-(3,5-di-t-butyl-4-hydroxyphenyl)propionate, and octyl 3-(3,54-butyl-4-hydroxy-3-methylphenyl)propionate, and commercial products such as, but not limited to, Irganox L135® (BASF), Naugalube 531® (Chemtura), and Ethanox 376® (SI Group).

Examples of the diarylamine oxidation inhibitors include alkyldiphenylamine having a mixture of alkyl groups of 3 to 9 carbon atoms, p,p-dioctyldiphenylamine, phenyl-naphthylamine, phenyl-naphthylamine, alkylated-naphthylamine, and alkylated phenyl-naphthylamine. The diarylamine oxidation inhibitors can have from 1 to 3 alkyl groups.

Each of the hindered phenol oxidation inhibitor and diarylamine oxidation inhibitor can be employed alone or in combination. If desired, other oil soluble oxidation inhibitors can be employed in combination with the above-mentioned oxidation inhibitor(s).

The lubricating oil composition of the invention may further contain an oxymolybdenum complex of succinimide, particularly a sulfur-containing oxymolybdenum complex of succinimide. The sulfur-containing oxymolybdenum complex of succinimide can provide increased oxidation inhibition when it is employed in combination with the above-mentioned phenolic or amine oxidation inhibitors.

In the preparation of lubricating oil formulations it is common practice to introduce the additives in the form of 10 to 80 wt. % active ingredient concentrates in hydrocarbon oil, e.g. mineral lubricating oil, or other suitable solvent.

Usually these concentrates may be diluted with 3 to 100, e.g., 5 to 40, parts by weight of lubricating oil per part by weight of the additive package in forming finished lubricants, e.g. crankcase motor oils. The purpose of concentrates, of course, is to make the handling of the various materials less difficult and awkward as well as to facilitate solution or dispersion in the final blend.

Processes of Preparing Lubricating Oil Compositions

The lubricating oil compositions disclosed herein can be prepared by any method known to a person of ordinary skill in the art for making lubricating oils. In some embodiments, the base oil can be blended or mixed with the silane-containing compounds described herein.

Optionally, one or more other additives in additional to the silane-containing compounds can be added. The silane-containing compounds and the optional additives may be added to the base oil individually or simultaneously. In some embodiments, the silane-containing compounds and the optional additives are added to the base oil individually in one or more additions and the additions may be in any order. In other embodiments, the silane-containing compounds and the additives are added to the base oil simultaneously, optionally in the form of an additive concentrate. In some embodiments, the solubilizing of the silane-containing compounds or any solid additives in the base oil may be assisted by heating the mixture to a temperature from about 25° C. to about 200° C., from about 50° C. to about 150° C. or from about 75° C. to about 125° C.

Any mixing or dispersing equipment known to a person of ordinary skill in the art may be used for blending, mixing or solubilizing the ingredients. The blending, mixing or solubilizing may be carried out with a blender, an agitator, a disperser, a mixer (e.g., planetary mixers and double planetary mixers), a homogenizer (e.g., Gaulin homogenizers and Rannie homogenizers), a mill (e.g., colloid mill, ball mill and sand mill) or any other mixing or dispersing equipment known in the art.

Application of the Lubricating Oil Compositions

The lubricating oil composition disclosed herein may be suitable for use as motor oils (that is, engine oils or crankcase oils), in a spark-ignited internal combustion engine, particularly a direct injected, boosted, engine that is susceptible to low speed pre-ignition.

The following examples are presented to exemplify embodiments of the invention but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention.

EXAMPLES

The following examples are intended for illustrative purposes only and do not limit in any way the scope of the present invention.

The test compounds were blended in gasoline or lube oil and their capacity for reducing LSPI events were determined using the test method described below.

A GM 2.0 L LHU 4-cylinder gasoline turbocharged direct-injected engine was used for LSPI testing. Each cylinder was equipped with a combustion pressure sensor.

A six-segment test procedure was used to determine the number of LSPI events that occurred under conditions of an engine speed of 2000 rpm and a load of 275 Nm. The LSPI test condition is run for 28 minutes with each segment separated by an idle period. Each segment is slightly truncated to eliminate the transient portion. Each truncated segment typically has approximately 110,000 combustion cycles (27,500 combustion cycles per cylinder). In total, the six truncated segments have approximately 660,000 combustion cycles (165,000 combustion cycles per cylinder).

LSPI-impacted combustion cycles were determined by monitoring peak cylinder pressure (PP) and crank angle at 5% total heat release (AI5). LSPI-impacted combustion cycles are defined as having both (1) a PP greater than five standard deviations than the average PP for a given cylinder and truncated segment and (2) an AI5 greater than five standard deviations less than the average for a given cylinder and truncated segment.

The LSPI frequency is reported as the number of LSPI-impacted combustion cycles per million combustion cycles and is calculated as follows:

LSPI Frequency=[(Total Number of LSPI Impacted Combustion Cycles in Six Truncated Segments)/(Total Number of Combustion Cycles in Six Truncated Segments)]×1,000,000

An additive associated with a test lubricant that reduces the LSPI frequency, when compared to the corresponding baseline lubricant, is considered an additive that mitigates LSPI frequency. The test results are set forth in Table 1.

Baseline Formulation

The base line formulation contained a Group 2 base oil, a mixture of primary and secondary dialkyl zinc dithiophosphates in an amount to provide 741-814 ppm phosphorus to the lubricating oil composition, a mixture of polyisobutenyl succinimide dispersants (borated and ethylene carbonate post-treated), a molybdenum succinimide complex in an amount to provide 177-187 ppm molybdenum to the lubricating oil composition, an alkylated diphenylamine antioxidant, a borated friction modifier, a foam inhibitor, a pour point depressant, and an olefin copolymer viscosity index improver. The baseline formulation contains about 5 ppm silicon from a foam inhibitor.

The lubricating oil compositions were blended into a 5W-30 viscosity grade oil.

Silane Compound A

The silane compound A was a commercially available silane compound which was Bis[3-(triethoxysilyl)propyl] disulfide with the chemical formula $C_{18}H_{42}O_6S_2Si$.

Example 1

A lubricating oil composition was prepared by adding about 1087 ppm of silicon from the silane-containing compound A and 2456 ppm of calcium from a combination of overbased Ca sulfonate and phenate detergents to the baseline formulation.

Comparative Example 1

A lubricating oil composition was prepared by adding 2399 ppm of calcium from a combination of overbased Ca sulfonate and phenate detergents to the baseline formulation.

Example 2

A lubricating oil composition was prepared by adding about 993 ppm of silicon from the silane-containing compound A and 2221 ppm of calcium from a combination of overbased Ca sulfonate and phenate detergents to the baseline formulation.

Example 3

A lubricating oil composition was prepared by adding about 520 ppm of silicon from the silane-containing compound A and 2218 ppm of calcium from a combination of overbased Ca sulfonate and phenate detergents to the baseline formulation.

Example 4

A lubricating oil composition was prepared by adding about 262 ppm of silicon from the silane-containing compound A and 2222 ppm of calcium from a combination of overbased Ca sulfonate and phenate detergents to the baseline formulation.

Comparative Example 2

A lubricating oil composition was prepared by adding 2255 ppm of calcium from a combination of overbased Ca sulfonate and phenate detergents to the baseline formulation.

TABLE 1

LSPI Test Results

| LSPI Activity (events/million combustion cycles) (events/100,000 combustion cycles) | Example 1 LSPI Activity (events/million combustion cycles) (events/100,000 combustion cycles) | Comparative Example 1 Reduction in LSPI Activity |
|---|---|---|
| 52 (5.2) | 278 (27.8) | 81% |

The data shows that Applicant's inventive example comprising the silane compound provided significantly better LSPI performance.

Low Speed Pre-ignition events were also measured in a Ford 2.0L Ecoboost engine. This engine is a turbocharged gasoline direct injection (GDI) engine.

The Ford Ecoboost engine is operated in four-roughly 4 hour iterations. The engine is operated at 1750 rpm and 1.7 MPa break mean effective pressure (BMEP) with an oil sump temperature of 95° C. The engine is run for 175,000 combustion cycles in each stage, and LSPI events are counted.

LSPI events are determined by monitoring peak cylinder pressure (PP) and mass fraction burn (MFB) of the fuel charge in the cylinder. When either or both criteria are met, it can be said that an LSPI event has occurred. The threshold for peak cylinder pressure varies by test, but is typically 4-5 standard deviations above the average cylinder pressure. Likewise, the MFB threshold is typically 4-5 standard deviations earlier than the average MFB (represented in crank angle degrees). LSPI events can be reported as average events per test, events per 100,000 combustion cycles, events per cycle, and/or combustion cycles per event. The results for this test are shown below.

TABLE 2

LSPI Test Results in Ford LSPI Test

|  | Ex. 2 | Ex. 3 | Ex. 4 | Comp. Ex. 2 |
|---|---|---|---|---|
| Si (ppm) | 998 | 520 | 262 | 4 |
| Ca (ppm) | 2221 | 2218 | 2222 | 2255 |
| Average Events | 3.75 | 4.25 | 9.5 | 19.25 |
| Average Events > 90 bar | 1.25 | 0.75 | 4.25 | 13.25 |

TABLE 2-continued

LSPI Test Results in Ford LSPI Test

|  | Ex. 2 | Ex. 3 | Ex. 4 | Comp. Ex. 2 |
|---|---|---|---|---|
| Average Events > 100 bar | 1 | 0.25 | 3.25 | 10.5 |
| Average Events > 110 bar | 1 | 0.25 | 3.0 | 8.75 |
| Average Events > 120 bar | 0.75 | 0 | 2.5 | 8.25 |

*Counts all cycles of LSPI where both MFB02 and Peak Pressure Requirements are met The data shows that Applicant's inventive examples comprising silane compounds of the disclosure provided significantly better LSPI performance both in terms of number of events and also the number of severe LSPI events than the comparative examples which did not contain the silane compound in the Ford engines. Severity is reduced by decreasing the number of high pressure events (i.e. over 120 bar) that can damage an engine.

What is claimed is:

1. A method for preventing or reducing low speed pre-ignition in a direct injected, boosted, spark ignited internal combustion engine, said method comprising the step of lubricating the crankcase of the engine with a lubricating oil composition comprising from about 100 to about 3000 ppm of silicon from at least one sulfur-containing silane compound, based on the total weight of the lubricating oil composition.

2. The method of claim 1, wherein the engine is operated under a load with a break mean effective pressure (BMEP) of from about 12 to about 30 bars.

3. The method of claim 1, wherein the engine is operated at speeds between 500 and 3,000 rpm.

4. The method of claim 1, wherein the silane-containing compound has the following generic formula (I): $[(R^1)_{3-a}(R^2O)_a Si]_r A$ (I), wherein $R^1$ is selected from the group consisting of saturated and unsaturated hydrocarbyl and chain-substituted saturated and unsaturated hydrocarbyl; $R^2$ is selected from the group consisting of hydrogen, saturated and unsaturated hydrocarbyl and chain-substituted saturated and unsaturated hydrocarbyl; a is an integer from 1 to 3, and A is a group of valence r, r being an integer greater than or equal to 1, selected from the group consisting of saturated and unsaturated, linear, branched, or cyclic hydrocarbyl groups, an oxygen atom, or a linear, branched, or cyclic siloxane or polysiloxane group, each of which, except for an oxygen atom, optionally comprises substituents having oxygen, nitrogen, sulfur, or halogen heteroatoms.

5. The method of claim 1, wherein the lubricating oil further comprises a detergent selected from calcium detergents, magnesium detergents, sodium detergents, lithium detergents, and potassium detergents.

6. The method of claim 5, wherein the detergent is a carboxylate, salicylate, phenate, or sulfonate detergent.

7. The method of claim 1, wherein the lubricating oil further comprises a molybdenum containing compound.

8. The method of claim 1, wherein the lubricant composition further comprises at least one other additive selected from an ashless dispersant, an ashless antioxidant, a phosphorus-containing anti-wear additive, a friction modifier, and a polymeric viscosity modifier.

9. The method of claim 1, wherein the engine is fueled with a liquid hydrocarbon fuel, a liquid nonhydrocarbon fuel, or mixtures thereof.

10. The method of claim 1, wherein the engine is fueled by natural gas, liquefied petroleum gas (LPG), compressed natural gas (CNG), or mixtures thereof.

\* \* \* \* \*